United States Patent Office 3,121,015
Patented Feb. 11, 1964

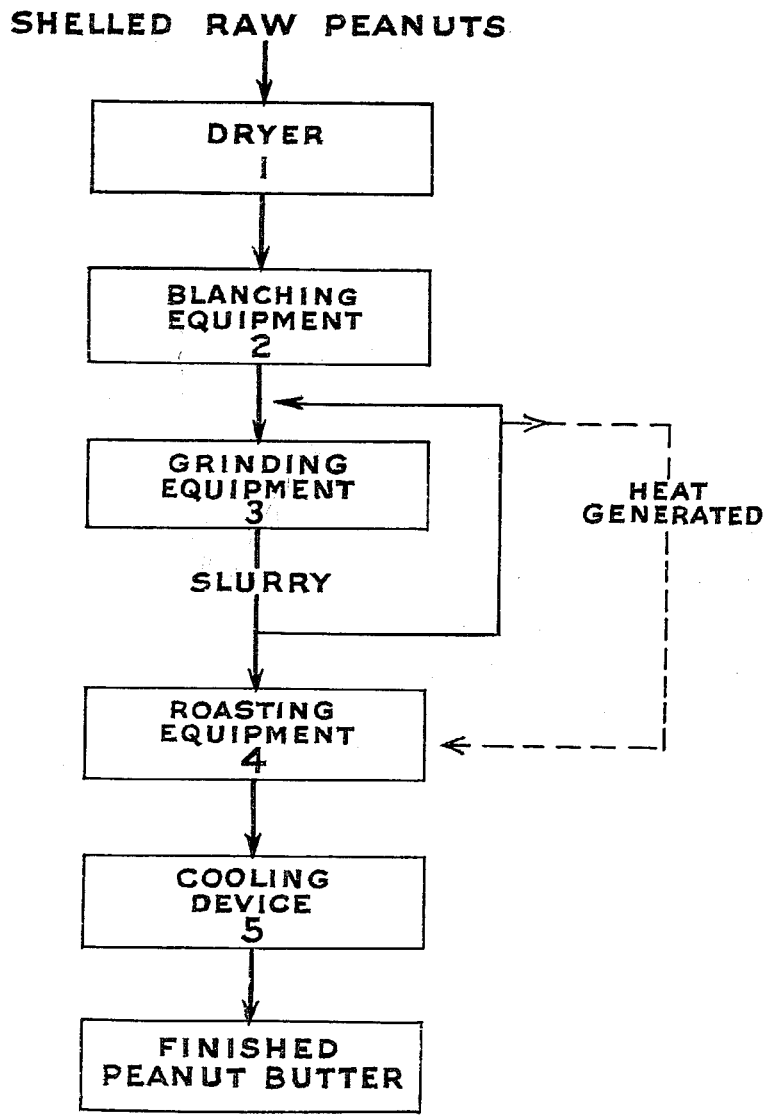

3,121,015
PEANUT BUTTER AND PROCESS FOR
MAKING THE SAME
Fitzhugh L. Avera, Alameda, Calif., assignor to Corn Products Company, New York, N.Y., a corporation of Delaware
Filed Mar. 9, 1961, Ser. No. 94,590
11 Claims. (Cl. 99—128)

This invention relates to a new and novel peanut butter and to a process for making the same. In general, it involves roasting peanuts after they have been ground which is in direct contrast to present methods wherein roasting always precedes grinding.

In the earlier prior art, it had been the practice to first roast shelled peanuts and then simply grind them, after blanching to a consistency known as peanut butter. The resultant product suffered two main disadvantages, one, of separating into a layer of oil and a layer of compacted solids, and, the other, the early development of rancidity due to oxidation of the separated oil. The first major advance in the art involved the step of adding hydrogenated, high melting point fat to prevent separation of and retard oxidation of the oil (Stockton U.S. Patent 1,395,934; Rosenfield U.S. Patent Re. 15,918). However, the presence of the high melting fats resulted in a loss of spreadability of the product, and a loss of palatability because of the undesirable mouthing characteristics of these fats and their inaccessibility to the taste buds due to their immobility.

The next major advance in the art involved overcoming the aforesaid disadvantages while maintaining the advantages. Avera U.S. Patent 2,504,620 uses a partially hydrogenated oil as a gravitational stabilizer and Avera U.S. 2,552,925 provides a peanut butter with improved spreadability, flavor and palatability wherein the fat is deliberately disassociated into discrete units containing a stabilizer.

In spite of these improvements certain major disadvantages remain in the present art, namely, deleterious or obnoxious flavors concomitant to under-roasting and over-roasting in the development of an average roast flavor due to moisture and thermal gradients within the whole or split peanut at the time of roasting. Furthermore, there is a need to reduce the degree of semi-perishability of peanut butter due to oxidative and heat deterioration during processing, and oxidative deterioration following processing. The process of the applicant affords substantial inhibition of the development of these disadvantages in the resultant product. Another disadvantage of the prior art is the development of deleterious heat during comminution of the roasted peanuts. The manufacturer must either use extra equipment directed solely to overcoming this disadvantage or suffer the consequences. As will be apparent hereinafter, applicant not only avoids the disadvantages of the heat of comminution but uses it to his advantage as an increment of the heat required to develop the roast flavor.

A primary object of the present invention is to provide a new and novel peanut butter of enhanced flavor and palatability and resistance to oxidation. A further object is to provide an improved process for making peanut butter. Another object is to provide a process for making peanut butter which avoids under- and over-roasting and the attendant development of unpleasant or noxious odors and flavors in the end product. Still another object is to provide a process for making peanut butter wherein the heat developed during grinding of the peanuts may be used as an increment of the heat of roasting. Other objects will appear hereinafter.

As already mentioned, my invention comprises, broadly speaking, roasting raw peanuts in the comminuted state. As will be noted hereinafter, my invention has broad attributes and represents a pioneering advance over the prior art. For example, the invention is adaptable to batch or continuous processing, or a combination thereof and the system can be a closed system where exposure to atmosphere is avoided. It can be used with or without gravitational stabilizers, such as hydrogenated oil, which prevent or inhibit oil stratification. The heat energy developed in the customary mechanical handling of peanuts, including grinding, can be used in the roasting step. The invention permits a greater latitude of roasting levels than heretofore. It is to be understood, however, that I am not to be limited to any of the embodiments hereinafter described, nor to the precise processes detailed, since my invention, as defined in the appended claims, can be embodied in a plurality and variety of forms and can be practiced in a plurality and variety of ways. Wherever the term "raw" is used herein in relation to peanuts such term shall be intended to include not only peanuts which have not been roasted but also peanuts in every condition short of completely roasted.

One commercially practicable method of manufacturing peanut butter by my invention comprises roasting ground raw peanuts. To the end that an optimum product may be produced, I preferably follow certain preliminary procedures in my improved process: namely, I subject any desired quantity of shelled, raw peanuts to a drying operation of the type which will allow reduction of the water content and equilibration of the residual water content. These procedures are preferably carried to an extent that the peanuts have but a residual moisture content of approximately 1 to 2 percent, by weight, thereby affording the additional advantages of more effective blanching and more desirable plasticity during the roasting operation. Thereafter, the peanuts are blanched to remove the red skin or peanut tests and, if desired, the peanut germs or nibs are also removed.

In accordance with the present invention, raw or incompletely roasted, shelled peanuts are thoroughly ground to provide a slurry of comminuted peanuts and exuded peanut oil having the consistency of peanut butter, i.e., the grinding is carried to the extent common in prior art practices of grinding roasted peanuts. Thereafter, I subject the comminuted blanched peanuts to external roasting heat, or generate within the comminuted peanuts a roasting temperature sufficient to develop the desired degree of peanut flavor and to roast the peanuts.

As previously mentioned, various modes of operation are possible. For example, in a preferred mode of carrying out the invention, applicant has successfully used a simple method of placing the comminuted and blanched peanuts in a stirring kettle wherein heat is applied to the outside of the kettle and the contents of the kettle are subjected to a roasting temperature. Thereafter, the roasted comminuted peanuts are cooled. It is, of course, well known that for the introduction of roasting heat into or removal of same from the comminuted blanched peanuts there are many industrial heat exchangers known in the art for achieving heat exchange with viscous materials. In these heat exchangers the internal walls are continually scraped to provide maximum heat exchange. Any of these heat exchangers are entirely suitable for roasting and cooling comminuted blanched peanuts.

It is also known that devices for generating heat within a product such as comminuted peanuts are available in such forms as dielectric heaters and the like. For example, the dielectric heater may comprise an enclosing, rapidly alternating electric field, including two electrode plates to which is applied a high frequency field with millions of reversals per second. Such equipment is currently available on the market. In the practice of this invention, the means for achieving a roasting heat are not limited to those disclosed herein. The roasting may take place at any time in the processing flow after grinding or a partial roast may be effected during grinding, e.g. immediately after grinding or even after packaging in intermediate or final containers including the glass jars customarily used to contain peanut butter for distribution to the consumer.

I have found that it is advantageous in the manufacture of peanut butter to remove gases dissolved or entrained in the slurry of comminuted peanuts. For example, in carrying out my invention this may be done at any time but, preefrably, just prior to roasting. Degassing equipment comprising a rotating drum and means for drawing a vacuum so as to take off vapors containing air or other gases is satisfactory. The rotating drum can be equipped with a blade or rotor for attenuating the slurry along the inner wall of a surrounding jacket, in the form of a thin film. Such film is subjected to relatively high vacuum to draw off from the attenuated film of the slurry any entrained or dissolved gases therein. Another method of degassing would be to operate the grinding equipment under vacuum to remove entrained gases.

As already mentioned, applicant's process can be carried out in a continuous manner. A preferred embodiment of such a process and of my invention is illustrated diagrammatically in the drawing.

Referring to the drawing, shelled peanuts were delivered into a dryer and moisture equilibrator 1 in the form of the traditional peanut roaster. I have also used a vacuum and heat moisture drying and moisture chamber wherein the moisture content of the peanuts is brought to a low and even content. The drying and equilibrating operation was continued, short of roasting, until the moisture content of the unroasted peanuts was reduced to preferably about 1 to 2 percent, by weight. The peanuts were then transferred to a conventional blanching mechanism 2 which in addition to removing the outer skin of the peanuts and the peanut germs also split the peanuts. The blanched peanuts were transferred to a grinding operation at 3. The grinding operation was carried out in conventional grinding equipment to produce unroasted peanut butter. The unroasted peanut butter was next roasted to the desired degree in heat exchange equipment 4 and cooled in other heat exchange equipment at 5. The desired flavors were added in a mixing vessel not shown, and the finished peanut butter was packed for sale to the consumer.

Another preferred embodiment of my process differs from the foregoing embodiment in that the peanuts were ground into unroasted peanut butter by utilizing two stages of grinding. The peanuts were taken from the blanching mechanism 2, and first roughly ground in a peanut butter mill and the effluent from this mill was continuously passed through another peanut butter mill where it was finely ground with a varying proportion of slurry being recirculated from the effluent of this mill back into the influent of this final mill. The major amount of heat developed during grinding of the last mentioned mill was sufficient to raise the temperature of the peanut butter to approximately 300° F., whereafter only approximately 50° F. further heat was required to complete the roast. This last mentioned heat increment was supplied by a heat exchanger through which the slurry was continuously passed. This embodiment is illustrated broadly in the drawing. During regrinding a temperature of about 300° F. was attained, as described, and an additional 50° F. was obtained during passages through the heat exchanger producing a completely roasted slurry at about 350° F.

In a modification of the foregoing preferred embodiment of my process, the slurry from the pre-grind or first peanut butter mill was transferred to an oil extracting device where a percentage of peanut oil was removed therefrom. A gravitational stabilizer, in this instance being hydrogenated peanut oil, was then introduced into the slurry prior to entrance to the final peanut butter mill. The peanut butter at the point of addition of the gravitational stabilizer was still unroasted.

I have found it desirable to continuously agitate or mix the slurry of comminuted peanuts during roasting in order to maintain uniform heat distribution throughout the product and obtain uniform roasting. This enables a roasted peanut butter flavor to be developed thoroughly under conditions wherein there is a relatively constant distribution of moisture and heat throughout the entire product being roasted. This is the first time in the art such a process has been conceived and practiced. It may be noted here that the relative size differential between the whole or split peanuts, roasted in accordance with the prior art, and the subdivided peanuts in the slurry roasted by the process of the present invention is such that thermal gradients heretofore occurring within the whole or split peanuts are substantially avoided; also the moisture gradients throughout the whole or split peanuts are avoided so that there is provided an even-roast flavor without the heretofore concomitant undesirable flavor flow due to under-roasting and over-roasting of the peanuts, inherently present in prior art methods of manufacturing peanut butter.

The new peanut butter produced by the process of my invention exhibits improved palatability, improved roast flavor characteristics, and improved resistance to the development of rancidity. For example, three to four times as many peroxides developed in one of the nationally popular peanut butters of the prior art as developed in the products made by the preferred embodiments of the process of the present invention, when the products were exposed to the same oxidizing conditions.

The peanut must be heated to develop roast flavors, but any subsequent heating or violent mechanical treatment after the roast flavors have been developed are generally recognized to be deleterious. Furthermore, it has been observed that films of peanut oil ostensibly free of solids are highly subject to oxidation. By avoiding the exposure of films of ostensibly solids-free exuded oil which come to the surface of a whole or split peanut during roasting, which act as precursors of rancidity, my improved peanut butter process overcomes this disadvantage. My improved peanut butter has been found to be more stable to oxidation and, therefore, more resistant to rancidity. Post-roasting heat and mechanical exposure of the type encountered in grinding after roasting in the prior art processes are eliminated. The post-roasting exposure to heat and oxidation in the prior art processes are avoided in the preparation of my improved peanut butter, and it is presumed that this is the reason my improved peanut butter is more stagle to oxidation after manufacture. As far as I am aware, this is the first time in the history of the art that peanuts have been roasted after grinding, and this represents not only a radical departure from prior practices but also produces an improved peanut butter.

This application is a continuation-in-part of my application Serial No. 22,562, filed April 15, 1960, and entitled "Peanut Butter Manufacturing Process and Equipment and Products Obtained Thereby," now abandoned.

I claim:

1. As a new product, a peanut butter processing full-bodied roast flavor of enhanced intrinsic uniformity and containing comminuted peanuts which are substantially free from under- and over-roasted flavors and possessing enhanced freedom from heat and oxidative deterioration and being prepared by comminuting substantially dehydrated raw peanuts to a fluid slurry and roasting said slurry.

2. As a new product, a peanut butter, possessing full-bodied roast flavor of enhanced intrinsic uniformity and containing comminuted peanuts which are substantially free from under- and over-roasted flavors and possessing enhanced freedom from heat and oxidative deterioration and being prepared by comminuting substantially dehydrated raw peanuts to a fluid slurry and roasting said slurry, and containing a stabilizer which prevents gravitational oil stratification.

3. A process for making peanut butter comprising roasting raw peanuts comminuted to a peanut butter slurry.

4. Process according to claim 3 wherein the slurry is agitated during roasting.

5. Process according to claim 4 wherein the slurry is passed through a high frequency electrical field to effect roasting.

6. A process for making peanut butter which comprises subjecting peanuts to a treatment to reduce and equilibrate the moisture content thereof, blanching the peanuts, comminuting the peanuts to a slurry and roasting the slurry.

7. Process according to claim 6 wherein the peanuts after said treatment contain not more than about 2 percent of moisture, by weight.

8. A process for making peanut butter comprising grinding raw and blanched peanuts to a peanut butter slurry and roasting the slurry.

9. Process according to claim 8 wherein a stabilizer which prevents gravitational oil stratification in the peanut butter is added.

10. A process for making peanut butter comprising grinding raw and blanched peanuts to a slurry, roasting the slurry and utilizing the heat developed during grinding as a major increment of the heat of roasting whereby the temperature of said peanut butter can be raised to about 300° F.

11. A process for making peanut butter comprising grinding raw and blanched peanuts, containing not more than 2 percent of moisture, to a slurry, roasting the slurry and utilizing the heat developed during grinding as an increment of the heat of roasting whereby the temperature of said peanut butter can be raised to about 300° F.

References Cited in the file of this patent
UNITED STATES PATENTS

| | | |
|---|---|---|
| Re. 15,918 | Rosenfield | Sept. 23, 1924 |
| 1,395,934 | Stockton | Nov. 1, 1921 |
| 2,198,220 | Musher | Apr. 23, 1940 |
| 2,585,970 | Shaw | Feb. 19, 1952 |
| 2,887,383 | Kopf | May 19, 1959 |

UNITED STATES PATENT OFFICE
CERTIFICATE OF CORRECTION

Patent No. 3,121,015                      February 11, 1964

Fitzhugh L. Avera

It is hereby certified that error appears in the above numbered patent requiring correction and that the said Letters Patent should read as corrected below.

Column 4, line 25, strike out "flow"; line 49, for "exposure" read -- exposures --; line 55, for " stagle" read -- stable --; line 67, for "processing" read -- possessing --.

Signed and sealed this 23rd day of June 1964.

SEAL)
Attest:

ERNEST W. SWIDER
Attesting Officer

EDWARD J. BRENNER
                                       Commissioner of Patents